May 29, 1923.
J. S. SIMS
1,456,579
BRAKE AND CLUTCH LOCK
Filed Nov. 13, 1920
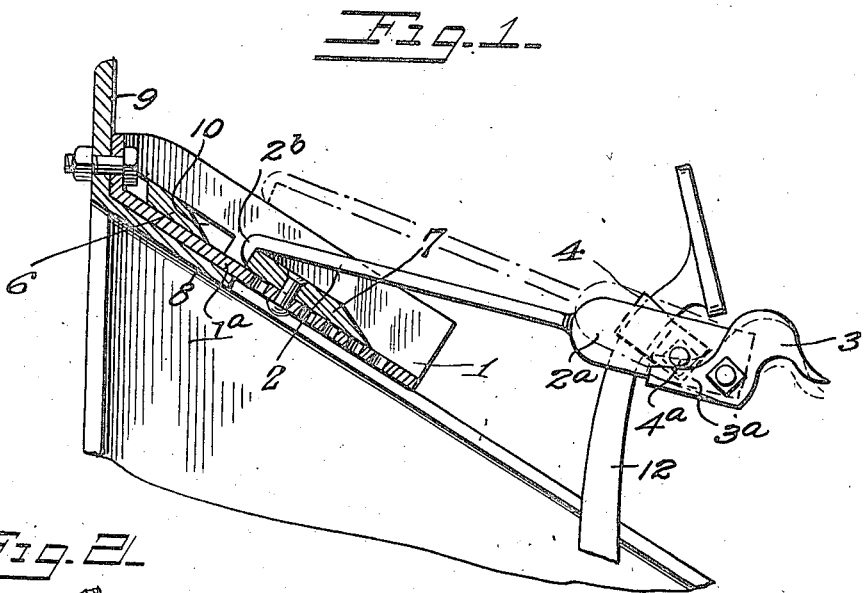
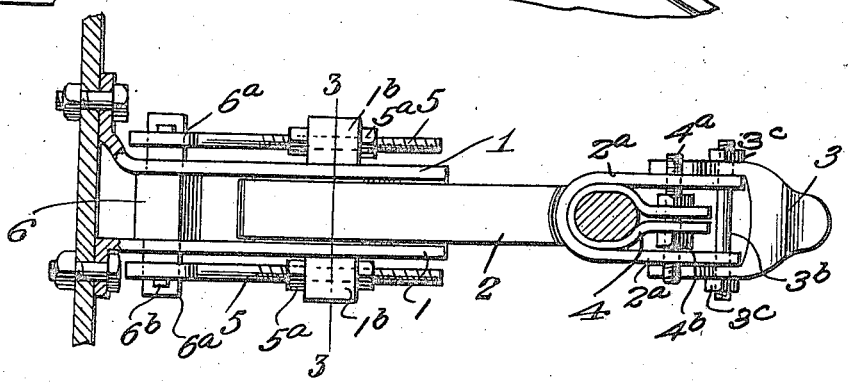
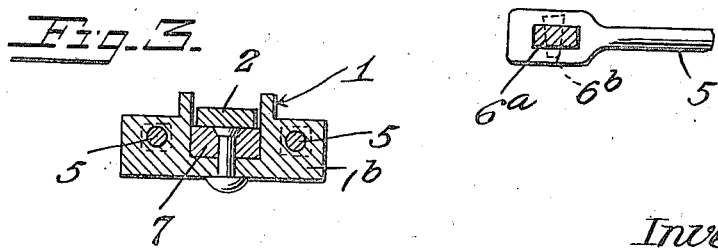
Inventor:
Joseph S. Sims Patented May 29, 1923.

1,456,579

UNITED STATES PATENT OFFICE.

JOSEPH S. SIMS, OF IDAHO FALLS, IDAHO.

BRAKE AND CLUTCH LOCK.

Application filed November 13, 1920. Serial No. 423,966.

*To all whom it may concern:*

Be it known that I, JOSEPH S. SIMS, a citizen of the United States, residing at Idaho Falls, in the county of Bonneville and State of Idaho, have invented certain new and useful Improvements in Brake and Clutch Locks, of which the following is a specification.

This invention relates to pedal locking devices for automobiles and more particularly of the type known as Ford cars.

One purpose and object of this invention is to provide a safety attachment upon the foot pedals of Ford cars, whereby the clutch pedal may be held in proper position without constant pressure of the foot thereon.

Another object is to enable the service brake to be set and held in place without the necessity of constant and continuous foot pressure.

Another object is to permit the operator to use the emergency brake on steep grades in any position and yet hold the clutch in neutral.

With these and other objects in view, the invention consists in certain novel constructions, arrangements and combinations of parts, as will be hereinafter described and pointed out in the claims, reference being had to the accompanying drawings in which, Figure 1 is a side elevation of the attachment with part of the frame broken away.

Figure 2 is a sectional plan view of the device.

Figure 3 is a transverse section taken on line 3—3 of Figure 2.

Figure 4 is a fragmentary side elevation of one of the adjusting bars.

Referring more particularly to the drawings showing one embodiment of my invention, 1 indicates a channeled bracket resting on the inclined foot-board 8 of the car being securely bolted at its front end to the dash 9. This bracket includes the side walls 1 and the bottom wall or floor $1^a$ which is provided with a number of perforations by which the ratchet lug 7 may be secured adjustably in the channel of the bracket. The perforations are located in the floor of the bracket and extend from near the center of same toward the rear end.

The side walls 1 of the bracket are provided at the front ends with slots 10 by means of which the ratchet lug 6 may be set and adjusted, said lug having lateral tongues $6^a$ projecting through said slots. Over these tongues are slipped the perforated ends of adjusting rods 5, being held thereon by the keys or pins $6^b$.

The rods 5, it will be noted are threaded, and pass through perforated lateral guide lugs $1^b$, extending from the side walls 1 of the bracket, and on these rods, on each side of the lugs, are threaded nuts $5^a$, by means of which the rods 5 can be caused to move longitudinally and thereby set and adjust the ratchet lug 6 to take care of wear on clutch (not shown).

The bracket and parts above referred to are held in place over the usual slot in the foot board and through this slot extends the usual pedal 12 having the foot piece at its upper end by which it is operated.

A lever pawl 2 is mounted to rock about the shank of the pedal 12 below the foot piece, the rear end of 2 being bifurcated or provided with ears $2^a$ on which is pivotally mounted the foot pressure member 3, the said member having side wings $3^a$ which fit over the outside of the ears $2^a$ and are secured thereon by the threaded bolt $3^b$ and the nuts $3^c$.

The lever pawl 2 is connected with the shank of the pedal by the yoke clip 4, the body portion of which embraces the shank, the side arms being perforated and through which perforations a threaded bolt $4^a$ is passed, said bolt being also threaded through the ears $2^a$ of the lever pawl. On said bolt, between the ears $2^a$ and the side arms of the yoke clip 4, are mounted nuts $4^b$ by means of which the arms of the yoke clip may be forced toward each other and thus tightly grip the yoke on the shank of the pedal.

The ends of the bolt $4^a$ extend some distance outside the ears $2^a$ and constitute abutments or stops beneath which the side wings $3^a$ of member 3 extend.

The front end of the lever pawl 2 is provided with a catch or tooth $2^b$ to engage the lugs 6 or 7 depending on what position it is desired to lock the pedal.

The lever pawl 2 is lifted to the position indicated in broken lines in Figure 1 by the operator applying pressure with the foot on the rear end 3 of the lever. The foot pedal is then moved to the desired position, and when pressure is relieved on member 3 the tooth or catch $2^b$ will drop in front of the ratchet lug 6 or 7 by its own weight, and hold the foot pedal in that position until changed by the operator. These lugs 6 and 7 are to be permanently attached to the bracket 1, but are each adjustable so as to be set in the correct position to properly hold the foot pedal in the exact position for neutral, clutch position or in low gear. The adjustment of lug 6 is secured through the adjusting bars or rods 5, by means of which lug 6 can be moved forward or backward to care for any wear on clutch or brake, or to permit new ones to be placed in the car, and adjust the lugs to the exact position to fit.

By the use of the above described device with the adjustable ratchet lugs and the rocking lever pawl, the driver of a car can set it in neutral for starting and at the same time set one or both brakes and hold the car for starting, or permit it to coast down grade at will and relieve the necessity of constant strain on the driver in holding the clutch pedal in its proper position. This avoids the necessity of pulling the emergency brake lever to hold the clutch in neutral, which always operates as a brake when in that position; or it will permit the operator to use the emergency brake on steep grades in any position, and yet hold the clutch in neutral.

By means of this device a car may be set in low gear for climbing long hills and the operator relieved from the constant strain of the pressure necessary to hold the clutch in contact or low gear.

Through the use of my invention, by reason of the holding of clutch in neutral for coasting on easy grades, there will be a saving of fuel.

Furthermore the lever pawl will operate as a means of holding engine in low gear, when necessary to work with engine in going down very steep hills, permitting the use of the working of the engine in low, and the operation of service and emergency brakes.

What I claim is:

1. A device for retaining the clutch and brake pedals of an automobile in operative position, comprising a lever pawl adapted for rocking connection with the shank of the pedal and having a catch at its forward end, a yoke clip mounted on said shank below the pedal tread thereof and pivotally supporting the rear end of the said lever pawl, a supplemental lever having a foot tread at one end pivotally mounted on the rear end of the lever pawl, the other end adapted for movable engagement with the rear end of the lever pawl whereby the catch end may be lifted, and ratchet lugs mounted on the footboard of the car adapted to be engaged by the said lever pawl.

2. A device for retaining the clutch and brake pedals of an automobile in operative position, comprising a lever pawl adapted for rocking connection with the shank of the pedal, and having a catch at its forward end, a clip member mounted on said shank below the pedal tread piece, and pivotally supporting the rear end of the lever pawl, said rear end having a lateral projection, and a supplemental foot-piece pivotally connected to the said rear end and having a portion adapted to engage said lateral projection, whereby to lift the forward end of the lever pawl upon application of pressure to the said supplemental foot piece, and means carried on the footboard of the car for engagement by said lever pawl.

3. A device for retaining the brake and clutch pedals of an automobile in operative position, comprising a lever pawl pivotally carried on the shank of the pedal adjacent the foot tread of the pedal, said lever pawl having a catch or tooth at its front end, the rear end bifurcated and spanning said shank of the pedal, a foot piece detachably connected with the bifurcations at the rear end of the lever pawl, means located within said bifurcations for pivotally connecting the lever pawl with pedal staff, and adjustable ratchet lugs mounted on the foot board of the car, adapted to be engaged by catch or tooth of said lever pawl.

4. A device for retaining the clutch and brake pedals of an automobile in operative position, comprising a lever pawl pivotally connected with the shank of the pedal adjacent the foot tread thereof, a channeled bracket adapted to be mounted on the foot board of the car forward of the pedal, ratchet lugs adjustably supported in said bracket, and means for adjusting said lugs, said means comprising tongues projecting from the ratchet lug through slots in the side walls of the bracket, threaded rods connected to said tongues, perforated lugs projecting laterally from the channeled bracket and through which said threaded rods extend, and nuts carried on said rods and abutting said lateral lugs.

5. A device for retaining the brake and clutch pedal of an automobile in set operative position, comprising a lever pawl adapted for pivotal connection with the shank of the pedal, said pawl having a catch or tooth at its front end, the rear end bifurcated and straddling said pedal shank, a yoke clip mounted on said shank, the arms of said clip perforated, a threaded bolt extending through said arms and through the bifurcations of the lever pawl, nuts mounted on said bolt between the arms of the clip and the bifurcations, said nuts adapted to force the arms of the yoke toward each other to clamp the yoke to the pedal shank, and a foot piece mounted on the bifurcated rear end of the lever pawl adapted to receive foot pressure to lift the front end of said pawl.

6. A device for retaining the pedals of an automobile in set operative position, as set forth in claim 5, the foot piece on the rear end of the lever pawl comprising a tread portion adapted to be engaged by the heel of the operator, side wings straddling the bifurcations of the lever pawl and fulcrumed on a shaft passing through said bifurcations, said wings extending forwardly beneath and adapted to abut the ends of the threaded bolt carrying the yoke clip, whereby pressure on the heel tread portion will rock the lever pawl about the pedal shank and lift the front end of said pawl.

JOSEPH S. SIMS.